US012443375B2

(12) United States Patent
Kaigawa

(10) Patent No.: US 12,443,375 B2
(45) Date of Patent: Oct. 14, 2025

(54) IMAGE FORMING APPARATUS CONFIGURED TO TRANSMIT PRINT INFORMATION TO EXTERNAL DEVICE WHEN CONSUMABLE ATTACHED THERETO IS SPECIAL CONSUMABLE AND WHEN PRINTING IS PERFORMED

(71) Applicant: BROTHER KOGYO KABUSHIKI KAISHA, Nagoya (JP)

(72) Inventor: Shinsuke Kaigawa, Kitanagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/435,072

(22) Filed: Feb. 7, 2024

(65) Prior Publication Data

US 2024/0176560 A1 May 30, 2024

Related U.S. Application Data

(62) Division of application No. 18/189,041, filed on Mar. 23, 2023, now Pat. No. 11,934,715.

(30) Foreign Application Priority Data

Apr. 1, 2022 (JP) ................................ 2022-062143

(51) Int. Cl.
*G06F 3/12* (2006.01)
*G06K 15/02* (2006.01)

(52) U.S. Cl.
CPC ............ *G06F 3/122* (2013.01); *G06F 3/1219* (2013.01); *G06F 3/1229* (2013.01); *G06K 15/1823* (2013.01)

(58) Field of Classification Search
None
See application file for complete search history.

(56) References Cited

U.S. PATENT DOCUMENTS

2006/0263105 A1* 11/2006 Able ...................... G03G 15/55 399/24
2018/0131831 A1* 5/2018 Tolia ..................... G06F 3/1229
2020/0064766 A1 2/2020 Ushinohama

FOREIGN PATENT DOCUMENTS

JP 2020-31386 A 2/2020

* cited by examiner

*Primary Examiner* — Andrew H Lam
(74) *Attorney, Agent, or Firm* — Merchant & Gould P.C.

(57) ABSTRACT

An image forming apparatus includes: a consumable including a consumable memory storing type information; a main casing to which the consumable is attached; a communication interface; and a controller. The type information indicates whether the consumable is a special consumable that can be used when the image forming apparatus is under a concluded agreement or a normal consumable that can be used irrespective of whether or not the image forming apparatus is under the concluded agreement. The controller is configured to perform: when determining that the attached consumable is the special consumable and when printing is performed based on a print instruction after the image forming apparatus is registered to be subjected to a newly concluded agreement, transmitting to an external device print information indicating that the printing is performed based on the print instruction to cause a concluded agreement for another image forming apparatus to be cancelled.

3 Claims, 10 Drawing Sheets

FIG. 4

| COMPONENT NAME | SERVICE LIFE (SHEETS) | CUMULATIVE NUMBER OF PRINTED SHEETS |
|---|---|---|
| BELT UNIT | 100000 | 80000 |
| LASER UNIT | 200000 | 80000 |
| FEED ROLLER | 100000 | 80000 |
| FIXING UNIT | 200000 | 80000 |
| ⋮ | ⋮ | ⋮ |

IMAGE FORMING APPARATUS CONFIGURED TO TRANSMIT PRINT INFORMATION TO EXTERNAL DEVICE WHEN CONSUMABLE ATTACHED THERETO IS SPECIAL CONSUMABLE AND WHEN PRINTING IS PERFORMED

REFERENCE TO RELATED APPLICATIONS

This application is a divisional of U.S. patent application Ser. No. 18/189,041 filed Mar. 23, 2023, which claims priority from Japanese Patent Application No. 2022-062143 filed on Apr. 1, 2022. The entire content of the priority application is incorporated herein by reference.

BACKGROUND ART

There are services that allow use of special subscription-based consumables or replacements on image forming apparatuses according to an agreement concluded between a user and a company. Such services are called as "subscription services". Various technologies are developed to implement subscription services.

For example, a prior art describes a technology for setting, in a case where a printer itself enters a subscription service, information to tags in cartridges attached to the printer indicating that the cartridges are for use in the subscription service. In a case where the printer does not enter a subscription service in this technology, information indicating that the cartridges are normal cartridges are set to tags in the cartridges attached to the printer. In order to receive a service related to image formation, such as the subscription service described above, the user needs to enter an agreement with the company that provides the service the user wishes to apply to the image forming apparatus.

DESCRIPTION

In the conventional method, when replacing an image forming apparatus subjected to an agreement in a subscription service described above, the user needs to change settings related to a procedure to cancel an agreement for an image forming apparatus under the agreement and to change settings related to a procedure to enter a new agreement for an image forming apparatus that is to be subjected to the new agreement.

In view of the foregoing, it is an object of the present disclosure to provide a technique for facilitating change of settings on an image forming apparatus when replacing an image forming apparatus subjected to an agreement.

In order to attain the above and other object, the present disclosure provides an image forming apparatus including: a consumable for use in the image forming apparatus; a main casing to which the consumable is attached; a communication interface; and a controller. The consumable includes a consumable memory storing therein type information. The type information indicates whether the consumable is a special consumable that can be used in the image forming apparatus when the image forming apparatus is under a concluded agreement or a normal consumable that can be used in the image forming apparatus irrespective of whether or not the image forming apparatus is under the concluded agreement. The controller is configured to perform: determining whether the consumable attached to the main casing is the special consumable on the basis of the type information stored in the consumable memory of the attached consumable; and when determining that the attached consumable is the special consumable and when printing is performed on the basis of a print instruction after the image forming apparatus is registered to be subjected to a newly concluded agreement, transmitting print information via the communication interface to an external device configured to communicate with the image forming apparatus to cause a concluded agreement for another image forming apparatus to be cancelled, the print information indicating that the printing is performed on the basis of the print instruction.

In the above structure, when use of the image forming apparatus to which the special consumable is attached is enabled and printing using the special consumable is performed by the image forming apparatus, the concluded agreement for the another image forming apparatus can be automatically cancelled. This process can facilitate a user in changing setting for the image forming apparatus and the another image forming apparatus when the another image forming apparatus is replaced with the image forming apparatus. Additionally, the user can use the another image forming apparatus until the enabled image forming apparatus starts to perform printing using the special consumable.

According to another aspect, the present disclosure also provides an image forming apparatus including: a communication interface; and a controller configured to perform: receiving, from an external device via the communication interface, a notification indicating that the image forming apparatus is to be replaced; when receiving the notification, starting measuring a period of time; and when the measured period of time reaches a prescribed period of time, deactivating a prescribed function of the image forming apparatus.

In the above structure, the image forming apparatus can automatically deactivate the prescribed function of the image forming apparatus when the prescribed period of time elapses after the image forming apparatus receives a notification indicating that the image forming apparatus is to be replaced. This process can facilitate the user in changing settings for the image forming apparatus when replacing the image forming apparatus.

According to still another aspect, the present disclosure also provides an image forming apparatus including: a consumable for use in the image forming apparatus; a main casing to which the consumable is attached; a communication interface; and a controller. The consumable includes a consumable memory storing therein type information. The type information indicates whether the consumable is a special consumable that can be used in the image forming apparatus when the image forming apparatus is under a concluded agreement or a normal consumable that can be used in the image forming apparatus irrespective of whether or not the image forming apparatus is under the concluded agreement. The controller is configured to perform: in a state where the image forming apparatus is under the concluded agreement, changing a condition for deactivating a prescribed function of the image forming apparatus on the basis of whether or not the image forming apparatus is connected to a network via the communication interface.

In the above structure, the image forming apparatus can change the condition for deactivating the prescribed function of the image forming apparatus under the concluded agreement according to whether the image forming apparatus is connected to the network via the communication interface to automatically deactivating the prescribed function. This process can facilitate the user in changing settings for the image forming apparatus when replacing the image forming apparatus under the concluded agreement.

According to still another aspect, the present disclosure also provides a method of changing settings related to contract procedures in an image forming apparatus to be subjected to a newly concluded agreement and another image forming apparatus under a concluded agreement and to be replaced with the image forming apparatus. Each of the image forming apparatus and the another image forming apparatus includes a communication interface, the image forming apparatus including a main casing to which a consumable is attached. The consumable includes a consumable memory storing therein type information. The type information indicates whether the consumable is a special consumable that can be used in the image forming apparatus when the image forming apparatus is under the newly concluded agreement or a normal consumable that can be used in the image forming apparatus irrespective of whether or not the image forming apparatus is under the newly concluded agreement. The method includes: when the image forming apparatus is connected to a network via the communication interface, transmitting a connection complete notification from the image forming apparatus via the communication interface to an external device configured to communicate with the image forming apparatus to cause the image forming apparatus to be registered to be subjected to the newly concluded agreement, the connection complete notification indicating that the image forming apparatus is connected to the network; after the transmitting is performed, causing the image forming apparatus to determine whether the consumable attached to the main casing is the special consumable on the basis of the type information stored in the consumable memory; and when determining that the consumable attached to the main casing is the special consumable and when printing is performed by the image forming apparatus on the basis of a print instruction, transmitting print information from the image forming apparatus to the external device via the communication interface to cause the concluded agreement for the another image forming apparatus to be cancelled, the print information indicating that the printing is performed by the image forming apparatus on the basis of the print instruction.

Also in the above method, when use of the image forming apparatus to which the special consumable is attached is enabled and printing using the special consumable is performed by the image forming apparatus, the concluded agreement for the another image forming apparatus can be automatically cancelled. This process can facilitate a user in changing setting for the image forming apparatus and the another image forming apparatus when the another image forming apparatus is replaced with the image forming apparatus. Additionally, the user can use the another image forming apparatus until the enabled image forming apparatus starts to perform printing using the special consumable.

FIG. 4 is a diagram illustrating an example of a service life table.

Hereinafter, one embodiment of the present disclosure will be described while referring to FIGS. 1 through 10. In the present embodiment, a case is described where image forming apparatuses 1 are laser printers, and image formation is printing. However, the image forming apparatuses 1 may be printers other than the laser printers. For example, the image forming apparatuses 1 may be inkjet printers.

Overview of Image Formation System

Figure 1:
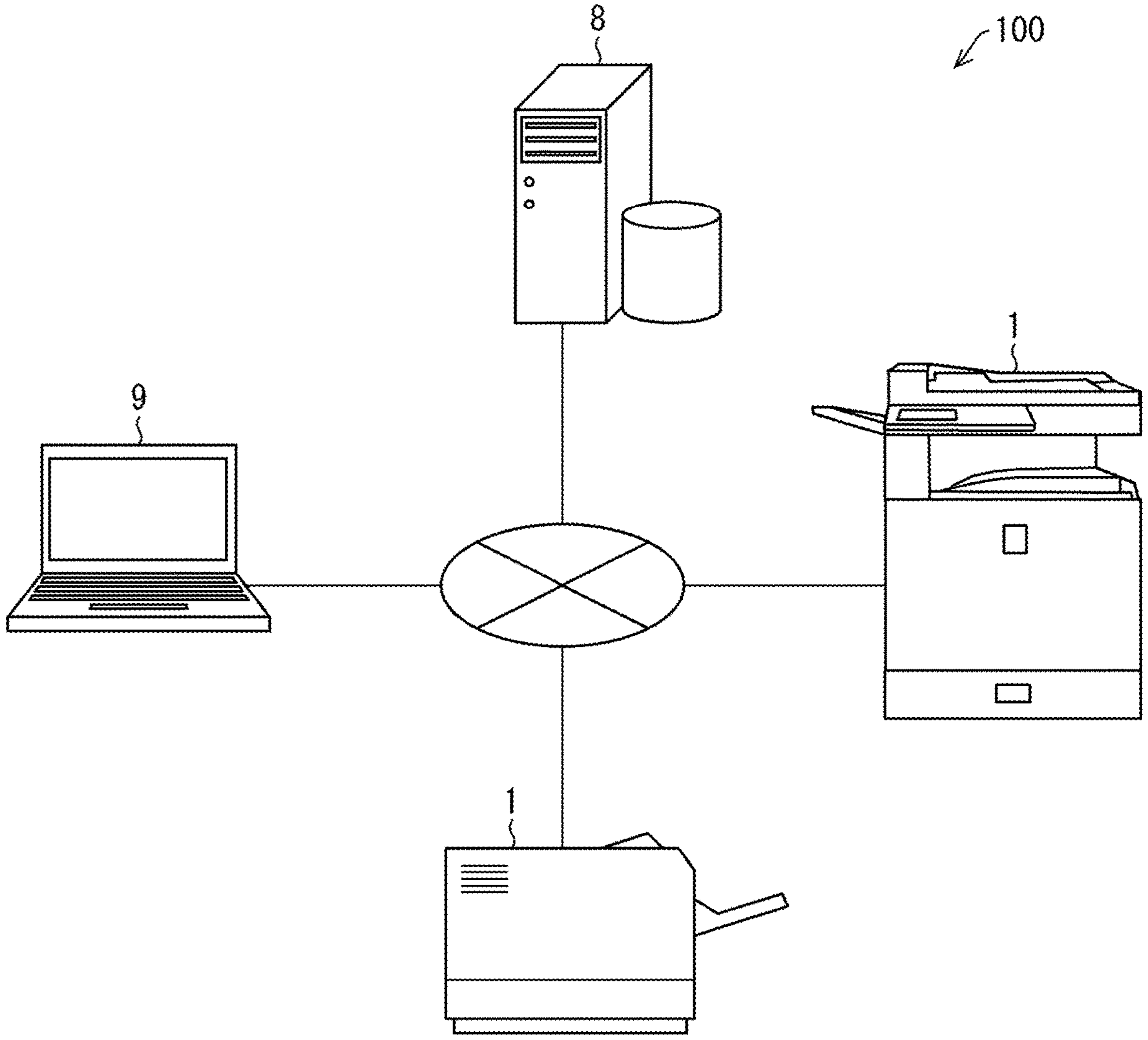
FIG. 1 is a diagram illustrating an overview of an image formation system.

FIG. 1 is a diagram illustrating an overview of an image formation system 100 according to the embodiment. As illustrated in FIG. 1, the image formation system 100 includes a plurality of image forming apparatuses 1, a server 8 as an example of the external device, and a user terminal 9. According to agreements concluded by the same user, the plurality of image forming apparatuses 1 illustrated in FIG. 1 are supplied to the user by the company. However, although not illustrated in the drawings, the image formation system 100 may include other image forming apparatuses purchased by the user.

Each of the image forming apparatuses 1 is a device for implementing a service provided based on an agreement concluded for the image forming apparatus 1. The server 8 is an external device that communicates with the image forming apparatuses 1 via a network and serves an example of a management device for managing the image forming apparatuses 1. In the present embodiment, the server 8 is a server managed by the company.

The "agreement" in the present embodiment indicates a contract concluded between a user and a company under which the company provides the user with a specific service via an image forming apparatus 1 designated by the user or an image forming apparatus 1 that the company has provided the user. In other words, the user concludes an agreement for a certain image forming apparatus 1. Also, the image forming apparatus 1 can be considered as a device subjected to an agreement. Hereinafter, the image forming apparatus 1 designated by the user as the subject of an agreement or the image forming apparatus 1 that the company provided the user as the subject of an agreement will be referred to as "contracted machine".

Once the user enters an agreement with the company, each of the image forming apparatuses 1 is supplied by the company to the user and can be used, for example, at a fixed monthly rate. Further, with an agreement concluded between the user and the company, each image forming apparatus 1 can use special subscription-based consumables, for example, at a fixed monthly rate. In an example of the agreement, the company providing the subscription service and the user agree on a usage period, a usage fee, the maximum number of printable sheets, and the like of the service, and both parties agree that the company will provide this service with the user.

In other words, once an agreement for the service is concluded, the image forming apparatus 1 in the present embodiment can perform subscription printing, which is printing using subscription-based consumables under the details of the concluded agreement. Alternatively, the image forming apparatus 1 may be a device that, once an agreement for the service is concluded, can be used under the details of the concluded agreement and can perform subscription printing which is printing using special subscription-based consumables under the details of the concluded agreement.

The user can register or change the image forming apparatus 1 serving as the contracted machine at any time. Here, the term "register" may indicate registering a new image forming apparatus 1 or re-registering a previously registered image forming apparatus 1 whose agreement is cancelled. The user can also register a plurality of image forming apparatuses 1 as contracted machines. In other words, the user can use a plurality of image forming apparatuses 1 simultaneously as contracted machines, and can change the image forming apparatus 1 targeted as the contracted machine from one image forming apparatus 1 to another image forming apparatus 1.

The user terminal 9 used by the user is a device that communicates with the server 8 in order to conclude and cancel an agreement and to perform other procedures. An information processing terminal equipped with standard communication functions, such as a personal computer (PC) or a smartphone, can be employed as the user terminal 9. The user may also transmit a print instruction to the image forming apparatus 1 through the user terminal 9 to print a desired number of sheets using the subscription-based consumables. The devices configuring the image formation system 100 can communicate with one another over a communication network such as the Internet.

<Overall Structure of Image Forming Apparatuses 1>

Figure 2:
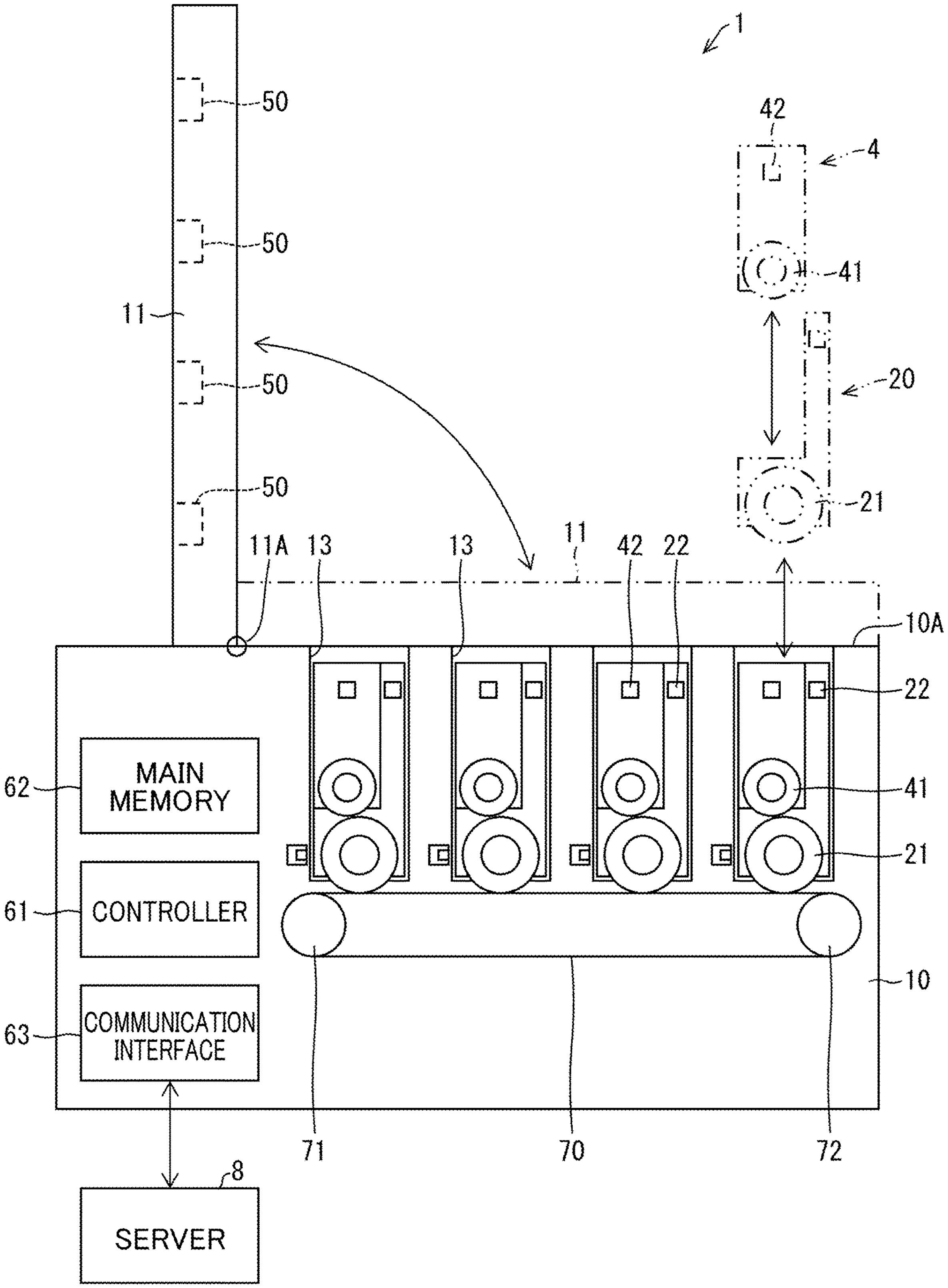
FIG. 2 is a schematic diagram of an image forming apparatus in the image formation system.
Figure 3:
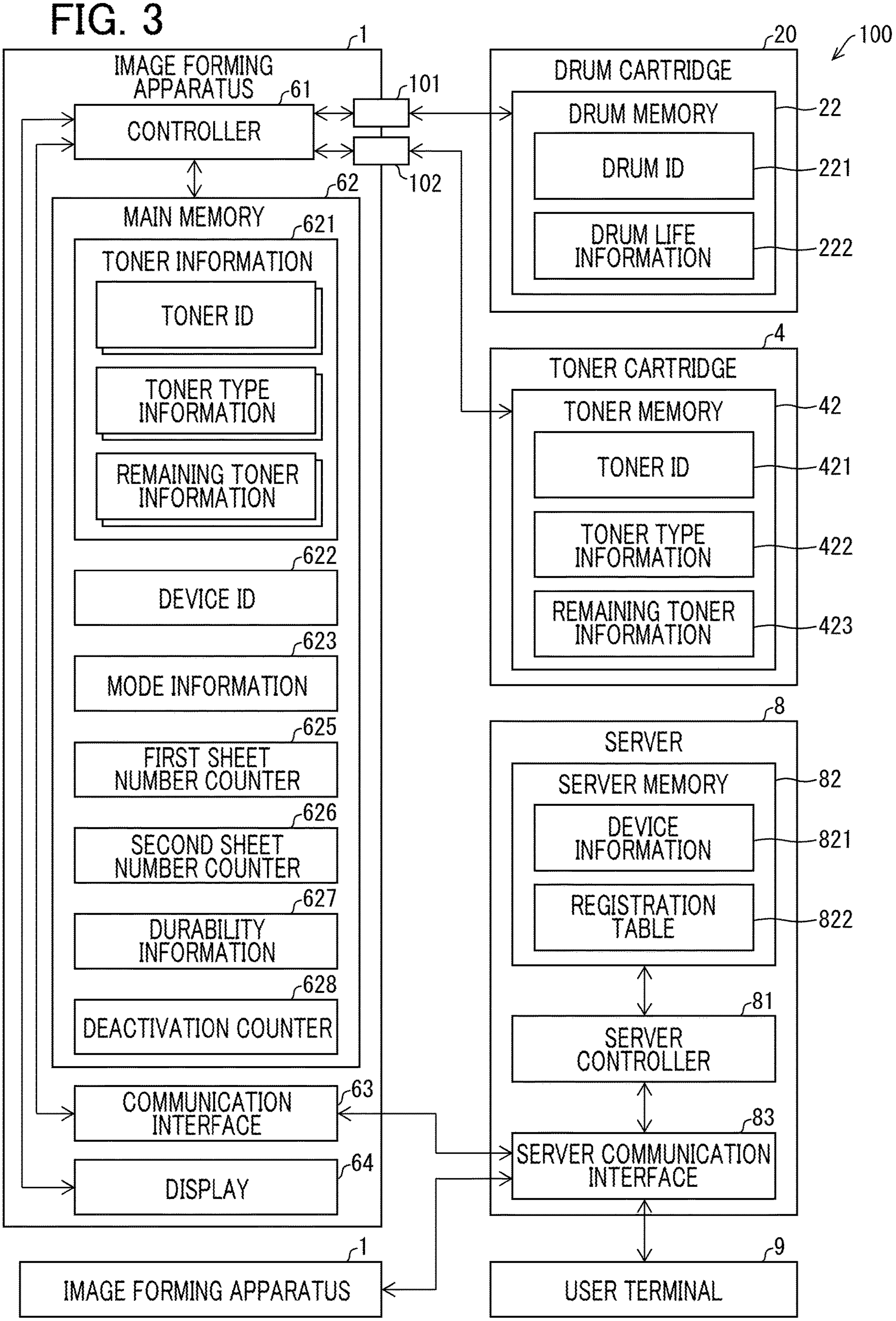
FIG. 3 is a diagram illustrating an internal structure of each of a server and the image forming apparatus including drum cartridges and toner cartridges, and illustrating connection relationship between the server and the image forming apparatus.

FIG. 2 is a schematic diagram of the image forming apparatus 1. FIG. 3 is a diagram illustrating internal structures of the image forming apparatuses 1 including drum cartridges 20 and toner cartridges 4, and the server 8, and illustrating the connection relationship between the image forming apparatuses 1 and the server 8. While FIG. 3 includes two image forming apparatuses 1, both image forming apparatuses 1 have the structures the same as each other.

As illustrated in FIG. 2, the image forming apparatus 1 includes a main casing 10, and a cover 11. As illustrated in FIG. 3, the image forming apparatus 1 further includes a display 64. The display 64 may include a liquid crystal display, a lamp and the like. A touchscreen is provided on the screen of the display 64 to function as an input interface.

<Main Casing 10>

Toner cartridges 4 are attachable to the main casing 10 of the image forming apparatus 1. As will be described later in detail, each of the toner cartridges 4 is attachable to a corresponding one of drum cartridges 20 to be integrated therewith. That is, while attached to the drum cartridge 20, the toner cartridge 4 is attachable together with the drum cartridge 20 to the main casing 10, thereby achieving the image forming apparatus 1 that includes the drum cartridge 20 and the toner cartridge 4.

Note that, in the image forming apparatus 1 according to the present embodiment, four toner cartridges 4 need to be attached to the main casing 10 in order to perform printing. In other words, in the image forming apparatus 1 according to the present embodiment, four drum cartridges 20 and four toner cartridges 4 are attachable to the main casing 10. However, the numbers of drum cartridges 20 and toner cartridges 4 attachable to the image forming apparatus 1 are not limited to the example of FIG. 2. For example, the image forming apparatus 1 may be a monochromatic printer that allows attachment of a single drum cartridge 20 and a single toner cartridge 4.

Each of the toner cartridges 4 includes toner that is consumed when the image forming apparatus 1 performs printing. That is, the toner cartridges 4 are consumables for the image forming apparatus 1. Further, each of the drum cartridges 20 includes a photosensitive drum 21 that is used for printing performed in the image forming apparatus 1. The drum cartridges 20 are also examples of consumables for the image forming apparatus 1.

The main casing 10 has a rectangular-parallelepiped box shape, for example. The four drum cartridges 20, the four toner cartridges 4, a transfer belt 70, a controller 61, a main memory 62, and a communication interface 63 are accommodated in the main casing 10. The main casing 10 has four cartridge retaining portions 13. Each of the cartridge retaining portions 13 is formed as a recess and has an opening. The drum cartridges 20 and the toner cartridges 4 are retained in corresponding cartridge retaining portions 13 to be attached to the main casing 10.

<Cover 11>

A plurality of light source units 50 are provided corresponding to the drum cartridges 20 at the cover 11 of the image forming apparatus 1. That is, the image forming apparatus 1 includes four light source units 50. The cover 11 is pivotally movable (movable) about a pivot shaft 11A extending in a first direction between an open position (a position indicated by solid lines in FIG. 2) in which the cover 11 opens an opening 10A and a closed position (a position indicated by two-dotted chain lines in FIG. 2) in which the cover 11 closes the opening 10A. In other words, the opening 10A provided in an upper end of the main casing 10 is opened and closed in accordance with the pivotal movement of the cover 11.

Note that the "first direction" indicates a direction in which a rotation center axis (a developing axis) of a developing roller of a toner cartridge extends. The openings of the cartridge retaining portions 13 are opened when the cover 11 is in the open position, and are covered by the cover 11 when the cover 11 is in the closed position.

A cover sensor (not illustrated) may be provided at the opening 10A of the main casing 10. The cover sensor is a sensor configured to detect that the cover 11 is in the closed position. The cover sensor may be a contact-type sensor or an optical sensor, for example.

<Toner Cartridges 4>

Each of the toner cartridges 4 includes a developing roller 41, and a cartridge casing that can accommodate therein developer (for example, toner) as an example of the printing material. Each of the cartridge casings of the toner cartridges 4 is attachable to the main casing 10. The four toner cartridges 4 accommodate therein developer of colors different from one another (for example, colors of cyan, magenta, yellow, and black) as the material used for image formation. The developer is a consumable that is consumed during use of the toner cartridge 4.

The developing roller 41 is a cylindrical member that extends in the first direction and is rotatable about its developing axis extending in the first direction. When the toner cartridge 4 is attached to the corresponding drum cartridge 20, an outer circumferential surface of the photosensitive drum 21 contacts an outer circumferential surface of the developing roller 41.

Each of the toner cartridges 4 also includes a toner memory 42 as an example of the consumable memory. The toner memory 42 is positioned at an outer surface of the toner cartridge 4 at one side in the first direction. The toner memory 42 is a memory to which information is writable and from which information is readable. For example, the toner memory 42 is a flash read-only memory (flash ROM) or an electrically erasable programmable read-only memory (EEPROM). “EEPROM” is a registered Japanese trademark of Renesas Electronics Corporation.

As illustrated in FIG. 3, each of the toner memories 42 has a first area 421, a second area 422, and a third area 423 for storing information related to the toner cartridge 4. The toner memory 42 stores a toner ID in the first area 421. The toner memory 42 stores toner type information as an example of the type information in the second area 422. The toner memory 42 stores remaining toner information in the third area 423. Note that the third area 423 is a rewritable area in which data stored therein is rewritable.

The toner ID is a unique serial number for identifying an individual toner cartridge 4, for example. The toner ID may include information specifying the color of toner in the toner cartridge 4.

The toner type information is information that indicates the type of the toner cartridge 4. There are two types of toner cartridges 4 in the present embodiment. The first type is “special cartridge” that can be used only in a contracted machine. The second type is “normal cartridge” that can also be used in an image forming apparatus 1 that does not serve as a contracted machine. Note that the toner type information may also be included in the toner ID. That is, the toner ID may be both information for identifying an individual toner cartridge 4 and information indicating the type of the toner cartridge 4. The special cartridge is an example of the special consumable, and the normal cartridge is an example of the normal consumable.

The remaining toner information indicates a remaining quantity of toner in the toner cartridge 4. In an example, the remaining quantity of toner is a value associated with one of a plurality of levels from full to empty, and the value is stored in the third area 423. Based on the value described above, each level of the remaining quantity of toner stored in the toner memory 42 may be a character string such as “full”, “empty”, and the like; may be a numerical value such as “100%”, “0%”, and the like; or may be information combining a character string and a numerical value.

<Drum Cartridges 20>

Each of the drum cartridges 20 includes a cartridge casing that is attachable to the main casing 10. The cartridge casing includes the photosensitive drum 21 as a component used for image formation. The photosensitive drum 21 is an example of a component that needs to be replaced since the outer circumferential surface of the photosensitive drum 21 is deteriorated by wear during use. The photosensitive drum 21 is a cylindrical photosensitive member extending in the first direction, and is rotatable about a drum axis extending in the first direction. The outer circumferential surface of the photosensitive drum 21 is coated with a photosensitive material.

Each of the drum cartridges 20 may include a drum memory 22. The drum memory 22 is a memory to which information is writable and from which information is readable. The drum memory 22 is a flash ROM or an EEPROM, for example. As described above, “EEPROM” is a registered Japanese trademark of Renesas Electronics Corporation.

Each of the drum memories 22 has a first area 221 and a second area 222 for storing information related to the photosensitive drum 21 of the drum cartridge 20. The drum memory 22 may store a drum ID in the first area 221. The drum memory 22 may store drum life information in the second area 222. The drum ID is a unique serial number for identifying an individual drum cartridge 20. The drum life information indicates the remaining life of the photosensitive drum 21.

<Attachment of Cartridges and Printing Mechanism>

As illustrated in FIG. 2, the drum cartridges 20 and the toner cartridges 4 are attachable to the main casing 10 in a state where the cover 11 is in the open position. In this state, the drum cartridges 20 and the toner cartridges 4 are inserted through the opening 10A into the corresponding cartridge retaining portions 13.

The main casing 10 also includes connectors 101 and 102. In a state where the drum cartridges 20 are inserted into the corresponding cartridge retaining portions 13, the connectors 101 are electrically connected to the drum memories 22 of the corresponding drum cartridges 20, thereby enabling the controller 61 to communicate with the drum memories 22. In a state where the toner cartridges 4 are attached to the main casing 10, the connectors 102 are electrically connected to the toner memories 42 of the corresponding toner cartridges 4 so that the controller 61 can communicate with the toner memories 42.

The four light source units 50 are attached to an inner surface of the cover 11. The light source units 50 are disposed such that the light source units 50 face the outer circumferential surfaces of the corresponding photosensitive drums 21 in a state where the drum cartridges 20 are attached to the main casing 10 and the cover 11 is in the closed position. Each of the light source units 50 has a plurality of light sources arranged in the first direction. The arranged light sources can irradiate the outer circumferential surface of the corresponding photosensitive drum 21 with light. The light sources are light-emitting diodes (LEDs), for example.

The light source units 50 are electrically connected to the controller 61. The controller 61 controls the light source units 50 based on inputted image data to emit light from the light sources in the light source units 50. The light sources of the light source units 50 irradiate the outer circumferential surfaces of the corresponding photosensitive drums 21 with light. As a result, the photosensitive material on the outer circumferential surfaces of the photosensitive drums 21 is exposed to light according to the image data.

The transfer belt 70 is a component configured to transfer developer (e.g., toner) carried on the outer circumferential surfaces of the photosensitive drums 21 onto printing paper. The transfer belt 70 is also an example of a component that needs to be replaced, since an outer peripheral surface of the transfer belt 70 is deteriorated by wear as the transfer belt 70 is used. The transfer belt 70 is a belt (an endless belt) having an annular shape that can contact each of the photosensitive drums 21. Specifically, the outer circumferential surfaces of the photosensitive drums 21 can contact the outer peripheral surface of the transfer belt 70. During a printing process, printing paper is conveyed between the transfer belt 70 and the photosensitive drums 21.

The transfer belt 70 is looped over a drive roller 71 and a follow roller 72. The drive roller 71 drives the transfer belt 70 to circularly move. The controller 61 controls the drive roller 71 to rotate. The follow roller 72 rotates along with the circular movement of the transfer belt 70 according to the drive of the drive roller 71.

<Internal Structure of Main Casing>

The controller 61 has an application-specific integrated circuit (ASIC), for example. The controller 61 is electrically connected to each of the main memory 62, the communication interface 63, and the display 64 those provided in the main casing 10. The controller 61 is configured to execute various processes to control the image forming apparatus 1 to perform a printing process and its related processes. Further, the controller 61 controls the display 64 to display thereon various information by executing various processes.

The controller 61 may also include a processor, such as a CPU. In this case, a control program for implementing a print control method may be stored in the main memory 62. The printing process may be executed in the image forming apparatus 1 by the processor of the controller 61 performing operations according to the control program stored in the main memory 62.

The controller 61 itself may also include a computer-readable storage medium that stores therein the control program. The storage medium may be a "non-transitory tangible medium," such as a read-only memory (ROM), a tape, a disc, a card, a semiconductor memory, or a programmable logic circuit. Alternatively, a random-access memory (RAM) for developing the control program may be employed.

The control program may be supplied to the computer via any transmission medium (a communication network, broadcast waves, etc.) capable of transmitting the control program. Note that, according to one aspect of the present disclosure, the control program can be implemented in the form of data signals embedded in a carrier wave embodied in electronic transmission.

When the drum cartridge 20 and the toner cartridge 4 are attached to the corresponding cartridge retaining portion 13 of the main casing 10, the drum memory 22 and the toner memory 42 are electrically connected to the controller 61, as illustrated in FIG. 3. In this state, the controller 61 can execute a read process for reading information from the connected drum memory 22 and toner memory 42, and a write process and/or a rewrite process for writing or rewriting information to the drum memory 22 and the toner memory 42.

The main memory 62 is a memory to which information is writable and from which information is readable. The main memory 62 is a flash ROM or an EEPROM, for example. The main memory 62 has a storage area 621 that stores therein toner information, a storage area 622 that stores therein a device ID, a storage area 623 that stores therein mode information, a storage area 625 that stores therein a first sheet number counter, and a storage area 626 that stores therein a second sheet number counter. The main memory 62 also has a storage area 627 that stores therein durability information such as a service life table (described later), and a storage area 628 that stores therein a deactivation counter representing a value for the remaining period of time until functions of the image forming apparatus 1 are deactivated.

The toner information is information related to individual toner cartridges 4 attached to the image forming apparatus 1. For example, the toner information may be data associating a toner ID read from a certain toner memory 42 with toner type information and remaining toner information read from the same toner memory 42. The main memory 62 may store data associated in this way in the storage area 621 for each toner cartridge 4.

The device ID is identification information for identifying the image forming apparatus 1. The device ID may be a serial number of the image forming apparatus 1, for example.

The mode information indicates an operation mode of the image forming apparatus 1. In the present embodiment, the mode information indicates one of two types of modes: a "subscription mode" indicating that the image forming apparatus 1 is registered as a contracted machine, and a "normal mode" indicating that the image forming apparatus 1 is not registered as a contracted machine or that the agreement for the image forming apparatus 1 is cancelled. When the image forming apparatus 1 to be newly registered as a contracted machine is shipped, a value corresponding to the normal mode is stored in the storage area 623 as an initial value. The controller 61 rewrites the mode information where appropriate.

The first sheet number counter may be stored in the storage area 625. The first sheet number counter indicates the cumulative number of sheets printed in the image forming apparatus 1. Also, the second sheet number counter may be stored in the storage area 626. The second sheet number counter indicates the number of sheets printed in the image forming apparatus 1 by the subscription printing.

The count of the second sheet number counter may be reset to 0 (zero) each time the image forming apparatus 1 shifts from the subscription mode to the normal mode or may be the cumulative number of sheets printed to date in the image forming apparatus 1 by the subscription printing. Unless otherwise specified, the value of the second sheet number counter hereafter will be the cumulative number of sheets printed in the image forming apparatus 1 by the subscription printing.

The communication interface 63 is a communication interface for conducting communications between the image forming apparatus 1 and the server 8. The communication interface 63 is configured to output various data, notifications, and requests received from the server 8 to the controller 61. Also, the communication interface 63 is configured to transmit various data, notifications, and requests inputted from the controller 61 to the server 8.

<User Terminal 9>

The user terminal 9 includes an input interface for receiving various input operations performed by the user, and a communication interface for communicating with the server 8. The user registers a contracted machine in the server 8 through input operations performed on the user terminal 9. For example, the user inputs, into the user terminal 9, the user's own identification information and identification information for the image forming apparatus 1 that the user wishes to register as a contracted machine. When receiving this input, the user terminal 9 transmits the inputted information to the server 8.

In addition to input operations for registering the contracted machine (i.e., for adding a contracted machine), the user terminal 9 may receive input operations for changing the contracted machine. For example, the user terminal 9 may receive input operations performed by the user to input the user's own identification information, identification information for a new contracted machine after change of the contracted machine, and identification information for the contracted machine before the change of the contracted machine. Subsequently, the user terminal 9 may transmit these three pieces of information to the server 8. When the user inputs print data, such as text or diagrams, via the user terminal 9, the user terminal 9 outputs print instruction to the image forming apparatus 1 based on the inputted print data, thereby causing the image forming apparatus 1 to perform printing based on the print data.

<Server 8>

The server 8 is a management device configured to manage an operation status of the image forming apparatus 1. The server 8 includes a server communication interface 83, a server memory 82, and a server controller 81. The server controller 81 is a central processing unit (CPU) that performs overall control of the server 8. The server memory 82 is a storage device that stores therein data required for operations in the server 8.

The server controller 81 updates a registration table stored in the server memory 82 in accordance with notifications or requests received from the image forming apparatuses 1. The registration table is a data table in which image forming apparatuses 1 that users or the server 8 (as described later) designated as contracted machines are registered. The registration table also stores therein data for each contracted machine indicating one of that the agreement for the contracted machine is currently valid or that the agreement for the contracted machine is not currently valid.

The server memory 82 has a storage area 821, and a storage area 822. The server memory 82 stores device information in the storage area 821. The server memory 82 stores the registration table in the storage area 822. Note that the storage area 822 is a rewritable area.

The device information is data compiling various information related to the image forming apparatus 1. The device information is stored separately for each image forming apparatus 1. The device information includes at least a device ID. In addition, the device information may include the value of the first sheet number counter and/or the value of the second sheet number counter.

The server communication interface 83 is a communication interface for conducting communications between the server 8 and the image forming apparatuses 1. The server communication interface 83 is configured to output various data, notifications, and requests received from image forming apparatuses 1 to the server controller 81. Also, the server communication interface 83 is configured to transmit various data, notifications, and requests inputted from the server controller 81 to the image forming apparatuses 1.

For example, the server communication interface 83 may receive a device ID and a value for the first sheet number counter and/or a value for the second sheet number counter from the image forming apparatus 1 and may output these values to the server controller 81. The server controller 81 may store the inputted device ID and value for the first sheet number counter and/or value for the second sheet number counter in association with each other in the server memory 82 as device information on the image forming apparatus 1.

<Service Life Table>

FIG. 4 illustrates an example of the service life table stored in the storage area 627 of the main memory 62 in the image forming apparatus 1. The service life table stores data associating the following information (1) to (3) as one record.

(1) identification information for a component in the main casing 10

(2) threshold information related to the service life of the component indicated by (1)

(3) information related to the cumulative number of printed sheets in the image forming apparatus 1

In the example of FIG. 4, "Component Name" column stores information indicating the names of the components as information (1). "Service Life (Sheets)" column stores information indicating the maximum cumulative number of printed sheets for the components indicated by (1) as information (2). The maximum cumulative number of printed sheets is the number of sheets that can be printed using the component indicated by (1) after the component is attached to the image forming apparatus 1 and until the component reaches the end of service life. Replacement is recommended for components that reach the end of service life. The "Cumulative Number of Printed Sheets" column stores the cumulative number of sheets printed in the image forming apparatus 1 as information (3).

Therefore, information in the "Cumulative Number of Printed Sheets" column indicating the cumulative number of printed sheets for each component is updated each time the image forming apparatus 1 performs printing. When any component managed in the service life table is replaced, the cumulative number of printed sheets associated with the identification information for the replaced component is initialized to "0" and the service life table stored in the storage area 627 of the main memory 62 is updated.

<Steps in Process for Entering Agreement>

When entering an agreement concluded between a user and a company, the user of the image forming apparatus 1 performs input operations on the user terminal 9 to newly register the image forming apparatus 1 as a contracted machine. Upon receiving these input operations, the user terminal 9 instructs the server 8 to newly register the image forming apparatus 1. The instruction for newly registering the image forming apparatus 1 may include a user name inputted by the user, and the device ID of a printer P1 either inputted by the user or acquired from the printer P1 by the user terminal 9.

The server controller 81 of the server 8 receives the instruction for a new registration via the server communication interface 83. Upon receiving the instruction for a new registration, the server controller 81 registers the image forming apparatus 1 in the storage area 822 of the server memory 82.

In the present embodiment, the image forming apparatus I can be used under the details of an agreement and can perform subscription printing using special cartridges under the details of the agreement. For example, the image forming apparatus I may be registered in the storage area 822 of the server memory 82 as a contracted machine that can be used at a fixed monthly rate and that can use special cartridges at a fixed monthly rate.

<Steps in Settings Change Process>

Next, a settings change process will be described for changing settings related to contract procedures for image forming apparatuses when one image forming apparatus registered as the contracted machine is replaced with a new image forming apparatus. Hereinafter, the image forming apparatus 1 for which an agreement is already concluded, i.e., the image forming apparatus 1 registered as the contracted machine, will be referred to as "printer P1". Further, the image forming apparatus 1 intended to replace the printer P1, i.e., the image forming apparatus 1 that is to be newly subjected to an agreement, will be referred to as "replacement printer P2". The printer P1 is an example of the another image forming apparatus under a concluded agreement, and the printer P2 is an example of the image forming apparatus to be subjected to a newly concluded agreement.

<1: Process Performed When the Replacement Printer P2 Performs Printing Within a Prescribed Period of Time>

Figure 5:
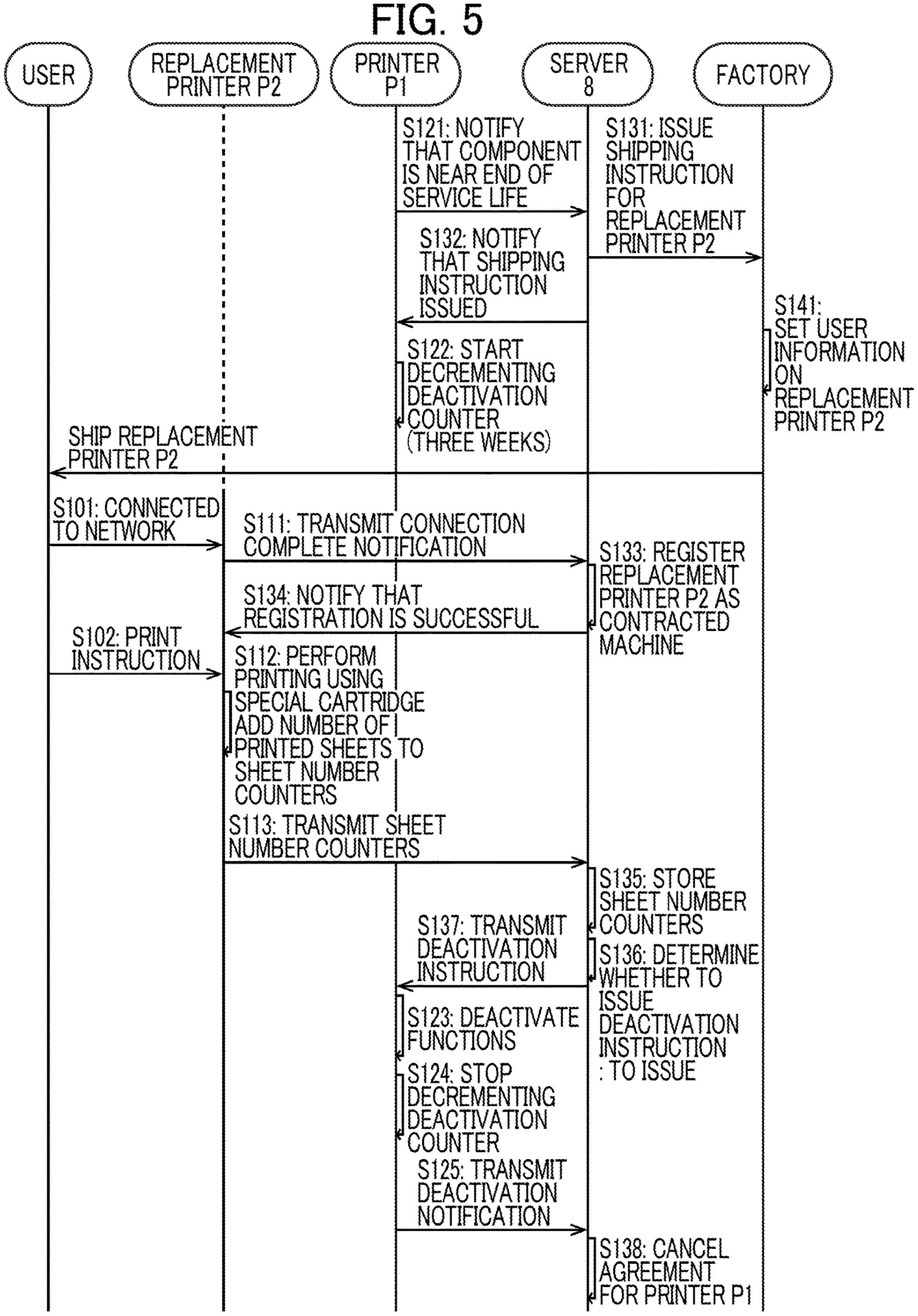
FIG. 5 is a sequence diagram illustrating an example of operations performed by devices in the image formation system when the image forming apparatus is replaced.

FIG. 5 is a sequence diagram illustrating an example of operations performed by the various devices in the image formation system 100 when replacing an image forming apparatus 1. FIG. 5 describes a case where the printer P1, an example of the image forming apparatus 1, is replaced with the replacement printer P2 supplied from the company and, for example, the replacement printer P2 performs printing using special cartridges within a prescribed period of time. The prescribed period of time in this process may be three weeks, for example. The prescribed period of time is not particularly limited and may be two weeks, four weeks, or the like. The present embodiment describes a case where the prescribed period of time is three weeks.

In the example of FIG. 5, the controller 61 of the printer P1 reads data in the service life table stored in the storage area 627 of the main memory 62 for each record. Next, the controller 61 of the printer P1 calculates the difference between the number of sheets in the "Service Life (Sheets)" column and the cumulative number of sheets printed by the image forming apparatus 1 in the "Cumulative Number of Printed Sheets" column for each record. When the calculated difference is less than or equal to a prescribed sheet number threshold, the controller 61 reads information indicating the name of the component from the "Component Name" column of the record. Next, the controller 61 transmits a notification to the server 8 via the communication interface 63 notifying that the component corresponding to the information indicating the name of the component is near the end of service life (S121).

The server controller 81 of the server 8 receives the notification from the printer P1 via the server communication interface 83. When the server controller 81 receives the notification indicating that a component is near the end of service life, the server controller 81 transmits a shipping instruction via the server communication interface 83 to a company terminal located at the company's factory instructing the company to ship a replacement printer P2 to the user (S131). Subsequently, the server controller 81 transmits a notification to the printer P1 via the server communication interface 83 indicating that the shipping instruction for a replacement printer P2 is transmitted to the company terminal (S132). The notification also indicates that the printer P1 will be replaced.

The company terminal receives the shipping instruction from the server 8 via a communication interface (not illustrated) in the company terminal. When the company terminal receives the shipping instruction instructing the company to ship a replacement printer P2 to the user, the company sets user information on the replacement printer P2 and ships the replacement printer P2 to the user (S141).

Specifically, the company configures user information at the factory as follows.

(i) A value representing "normal mode" is stored in the storage area 623 of the main memory 62 in the replacement printer P2 indicating that the replacement printer P2 is not registered as a contracted machine.

(ii) The first sheet number counter stored in the storage area 625 of the main memory 62 and the second sheet number counter stored in the storage area 626 of the main memory 62 in the replacement printer P2 are initialized.

(iii) If any component listed under "Component Name" column in the service life table stored in the storage area 627 of the main memory 62 in the replacement printer P2 is replaced, the cumulative number of printed sheets in the "Cumulative Number of Printed Sheets" column corresponding to the replaced component in the service life table is initialized.

(iv) The deactivation counter stored in the storage area 628 of the main memory 62 in the replacement printer P2 is initialized.

The controller 61 in the printer P1 receives the notification from the server 8 via the communication interface 63 indicating that the shipping instruction for a replacement printer P2 is sent to the company terminal. When the controller 61 receives the notification indicating that the shipping instruction for a replacement printer P2 is sent to the factory, the controller 61 starts decrementing the deactivation counter stored in the storage area 628 of the main memory 62 (S122). The deactivation counter is a value representing the remaining period until prescribed functions such as the print function of the printer P1 are deactivated. The process in S132 is an example of the receiving.

In the meantime, once the replacement printer P2 sent to the user is connected to a network via the communication interface 63 (S101), the controller 61 in the replacement printer P2 transmits a connection complete notification to the server 8 via the communication interface 63 indicating that the replacement printer P2 is connected to the network (S111). The process in S111 is an example of the transmitting.

The server controller 81 of the server 8 receives the connection complete notification from the replacement printer P2 via the server communication interface 83. Upon receiving the connection complete notification from the replacement printer P2, the server controller 81 registers the replacement printer P2 in the storage area 822 of the server memory 82 as a contracted machine that can be used under the details of the agreement (S133).

Next, the server controller 81 transmits a notification to the replacement printer P2 via the server communication interface 83 indicating that registration of the replacement printer P2 on the server 8 as a contracted machine is successful (S134). The controller 61 of the replacement printer P2 receives the notification from the server 8 via the communication interface 63 indicating that the registration of the replacement printer P2 as a contracted machine is successful. Upon receiving the notification from the server 8 that registration as a contracted machine is successful, the controller 61 stores a value representing "subscription mode" in the storage area 623 of the main memory 62.

Thereafter, when the user inputs print data, such as text or diagrams, and a print instruction into the user terminal 9, the user terminal 9 instructs the replacement printer P2 via the network to perform printing on the basis of the print data inputted by the user (S102). The controller 61 of the replacement printer P2 receives the print data and the print instruction from the user terminal 9 via the communication interface 63. When receiving the print instruction and the print data, the controller 61 determines whether special cartridges are attached to the replacement printer P2. When the controller 61 determines that special cartridges are attached to the replacement printer P2, the controller 61 controls the replacement printer P2 to perform printing using the special cartridges on the basis of the print data, and counts the number of printed sheets.

The controller 61 of the replacement printer P2 adds the number of sheets printed using the special cartridges to the first sheet number counter stored in the storage area 625 of the main memory 62 and the second sheet number counter stored in the storage area 626 of the main memory 62. The controller 61 also adds the number of sheets printed using the special cartridges to the cumulative number of printed sheets in the "Cumulative Number of Printed Sheets" column for each record in the service life table stored in the storage area 627 of the main memory 62 (S112). Subsequently, the controller 61 transmits the first sheet number counter stored in the storage area 625 of the main memory 62 and the second sheet number counter stored in the storage area 626 of the main memory 62 to the server 8 via the communication interface 63 as printed sheet number data (S113). The process in S113 is an example of the transmitting. The first sheet number counter and the second sheet number counter transmitted in S113 are examples of the print information.

The server controller 81 of the server 8 receives the first sheet number counter and the second sheet number counter from the replacement printer P2 via the server communication interface 83. The server controller 81 stores (registers) the received first sheet number counter in the storage area 821 of the server memory 82 in association with the replacement printer P2. The server controller 81 also stores (registers) the received second sheet number counter in the storage area 821 of the server memory 82 in association with the replacement printer P2 (S135).

Next, the server controller 81 determines whether to issue a deactivation instruction instructing the printer P1 to deactivate the print function of the printer P1 (S136). When the server controller 81 does not receive a notification from the printer P1 via the server communication interface 83 indicating that the print function and other functions are already deactivated, the server controller 81 determines that a deactivation instruction for instructing the printer P1 to deactivate functions such as the print function needs to be transmitted to the printer P1. The server controller 81 transmits the deactivation instruction to the printer P1 via the server communication interface 83 instructing the printer P1 to deactivate the print function and other functions (S137). The process in S137 is an example of the causing.

The controller 61 of the printer P1 receives the deactivation instruction from the server 8 via the communication interface 63. Upon receiving the deactivation instruction from the server 8, the controller 61 deactivates the print function and other functions (S123). Next, the controller 61 stops decrementing the deactivation counter stored in the storage area 628 of the main memory 62 (S124). Thereafter, the controller 61 transmits a deactivation notification to the server 8 via the communication interface 63 indicating that prescribed functions such as the print function are deactivated (S125). The process in S123 is an example of the deactivating.

The server controller 81 of the server 8 receives the deactivation notification from the printer P1 via the server communication interface 83 indicating that the print function and other functions are deactivated. Upon receiving the deactivation notification from the printer P1 indicating that the print function and other functions are deactivated, the server controller 81 invalidates the registration for the printer P1 stored in the storage area 822 of the server memory 82 as a contracted machine that can be used under the details of the agreement. The server controller 81 also invalidates the registration of the printer P1 as a contracted machine capable of performing subscription printing using special cartridges under the details of the agreement. As a result, the server controller 81 cancels the registration for the printer P1 as a contracted machine, i.e., cancel the agreement for the printer P1 (S138).

According to the above process, the replacement printer P2 transmits a connection complete notification to the server 8 indicating that the replacement printer P2 is connected to the user terminal 9 to allow the replacement printer P2 to be registered in the storage area 822 of the server memory 82 as a contracted machine that can be used under the details of the agreement. Additionally, the replacement printer P2 can also be registered in the storage area 822 of the server memory 82 as a contracted machine that can perform subscription printing using special cartridges under the details of the concluded agreement.

The replacement printer P2 also performs an initial printing using special cartridges after registered as a contracted machine. Subsequently, the replacement printer P2 transmits the first sheet number counter stored in the storage area 625 of the main memory 62 and the second sheet number counter stored in the storage area 626 of the main memory 62 to the server 8. As a result, the server controller 81 of the server 8 can deactivate the printing function and other functions of the printer P1 and can cancel the agreement for the printer P1 as a contracted machine.

This process can facilitate the user in changing settings for the printer P1 and the replacement printer P2 when replacing the printer P1 as a contracted machine with the replacement printer P2. The user can also print on the printer P1 using special cartridges until the replacement printer P2, serving as the contracted machine, starts to perform printing using special cartridges.

<2: Process Performed When the Replacement Printer P2 does not Perform Printing Within the Prescribed Period of Time>

Figure 6:
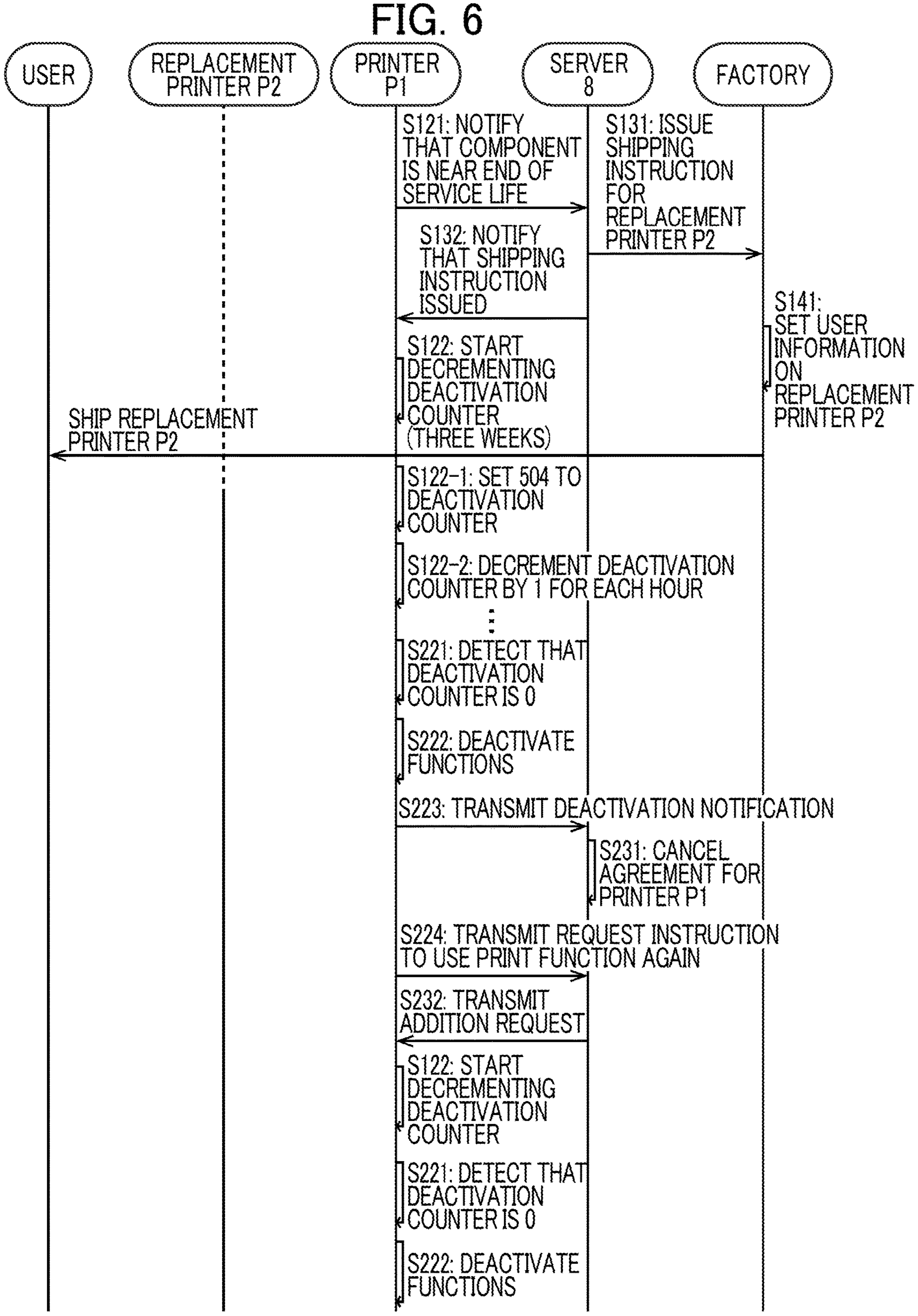
FIG. 6 is a sequence diagram illustrating another example of operations performed by the devices in the image formation system when the image forming apparatus is replaced.

FIG. 6 is a sequence diagram illustrating another example of the operations performed by the various devices in the image formation system 100 when an image forming apparatus 1 is replaced. FIG. 6 describes a case where the replacement printer P2 does not perform printing using special cartridges after the replacement printer P2 is supplied from the company.

In the example of FIG. 6, the controller 61 of the printer P1 executes the process of S121 described above (see FIG. 5) to transmit a notification to the server 8 via the communication interface 63 indicating that there is a component in the main casing 10 which is near the end of service life (S121). The server controller 81 of the server 8 receives the notification from the printer P1 via the server communication interface 83. The server controller 81 executes the process of S131 described above (see FIG. 5) to transmit a shipping instruction via the server communication interface 83 to the company terminal at the company's factory instructing the company to ship a replacement printer P2 to the user (S131). Subsequently, the server controller 81 executes the process in S132 described above (see FIG. 5) to notify the printer P1 via the server communication interface 83 that the shipping instruction instructing to ship a replacement printer P2 is transmitted to the company terminal (S132).

When the company terminal receives the shipping instruction from the server 8 via the communication interface (not illustrated) thereof, through the process of S141 described above the company terminal ships to the user a replacement printer P2 in which the user information is set (S141).

Upon receiving the notification from the server 8 via the communication interface 63 indicating that the shipping instruction to ship a replacement printer P2 is transmitted to the company terminal, the controller 61 of the printer P1 executes the process in S122 described above to start decrementing the deactivation counter stored in the storage area 628 of the main memory 62 (S122). The process in S122 is an example of the starting.

The method of decrementing the deactivation counter is as follows, for example. First, the controller 61 assigns "504", which is a value representing the number of hours in three weeks as the prescribed period of time, to the deactivation counter stored in the storage area 628 of the main memory 62 (S122-1). Each time one hour elapses, the controller 61 reads the deactivation counter from the storage area 628 of the main memory 62 and decrements the deactivation counter by 1. When the deactivation counter after decremented by 1 is not “0”, the controller 61 assigns the decremented value to the deactivation counter again (S122-2).

When the controller 61 detects that the deactivation counter decremented by 1 is now “0” (S221), the controller 61 stops decrementing the deactivation counter and deactivates the print function and other functions of the printer P1 (S222). Next, the controller 61 transmits a deactivation notification to the server 8 via the communication interface 63 indicating that the print function and other functions are deactivated (S223). The process in S222 is an example of the deactivating. The process in S223 is an example of the transmitting. The print function is an example of the prescribed function. The deactivation notification is an example of the deactivation information.

The server controller 81 of the server 8 receives the deactivation notification from the printer P1 via the server communication interface 83 indicating that the print function and other functions are deactivated. Upon receiving the deactivation notification from the printer P1 indicating that the print function and other functions are deactivated, the server controller 81 invalidates the registration for the printer P1 stored in the storage area 822 of the server memory 82 as a contracted machine that can be used under the details of the agreement. The server controller 81 also invalidates the registration of the printer P1 as a contracted machine that can perform subscription printing using special cartridges under the details of the agreement. As a result, the server controller 81 terminates the agreement for the printer P1 as a contracted machine (S231).

As will be described later, the controller 61 of the printer P1 subsequently displays a deactivation screen (see FIG. 10) on the display 64 displayed while the print function and other functions are deactivated. When a request instruction is inputted via a touchscreen (not illustrated) provided on the screen of the display 64 or the like requesting that use of the print function be permitted again for a prescribed time, the controller 61 transmits the above request instruction to the server 8 via the communication interface 63 (S224).

The server controller 81 of the server 8 receives the above request instruction from the printer P1 via the server communication interface 83. Upon receiving the request instruction, the server controller 81 transmits an addition request to the printer P1 via the server communication interface 83 (S232). An addition request is a request to add a value representing a prescribed extension period to the deactivation counter stored in the storage area 628 of the main memory 62. The value representing the prescribed extension period may be “504”, for example, representing an extension period of three weeks.

The controller 61 of the printer P1 receives the addition request from the server 8 via the communication interface 63. Upon receiving the addition request from the server 8, the controller 61 executes the processes in S122, S221, and S222 again. In this case, the process in S122 is an example of the starting, and the process in S222 is an example of the deactivating.

According to the above process, the controller 61 of the printer P1 can automatically deactivate the print function and the like when a prescribed period of time such as three weeks elapses after the controller 61 receives a notification from the server 8 via the communication interface 63 indicating that the replacement printer P2 is shipped. The controller 61 of the printer P1 also notifies the server 8 via the communication interface 63 that the print function and other functions are deactivated. When the server controller 81 of the server 8 receives the deactivation notification from the printer P1 via the server communication interface 83 indicating that functions such as the print function are deactivated, the server controller 81 cancels the agreement for the printer P1 as a contracted machine. This process can facilitate the user in changing settings to cancel the agreement for the printer P1 as a contracted machine.

As described above, the image forming apparatus 1 changes conditions for deactivating prescribed functions according to whether the image forming apparatus 1 is connected to a network via the communication interface 63 (an example of the changing). In the first case illustrated in FIG. 5 where both the replacement printer P2 and the printer P1 are connected to the network via corresponding communication interfaces 63, the server 8 transmits a deactivation instruction to the printer P1 after the replacement printer P2 performs an initial printing using special cartridges. Upon receiving the deactivation instruction from the server 8, the printer P1 deactivates the print function and other functions. After receiving a deactivation notification from the printer P1 indicating that the print function and other functions are deactivated, the server 8 can invalidate the registration for the printer P1 as a contracted machine.

There is the second case illustrated in FIG. 6 where the replacement printer P2 sent to the user is not connected to a network via the communication interface 63 within a prescribed period of time, such as three weeks. There may also be a case where the replacement printer P2 does not reach the user within the prescribed period of time due to problems during transport or the like. In such cases, the printer P1 is connected to the network via the communication interface 63 while the replacement printer P2 is not connected to the network via the communication interface 63.

Therefore, since the printer P1 does not receive a deactivation instruction from the server 8 via the communication interface 63, the printer P1 continues to decrement the deactivation counter. When the deactivation counter reaches “0”, the printer P1 deactivates functions such as the print function. The server 8 can then receive a deactivation notification from the printer P1 indicating that the print function and other functions are deactivated and can invalidate the registration of the printer P1 as a contracted machine.

Also conceivable is the third case where the printer P1 is disconnected from the network after the controller 61 of the printer P1 executes the process in S122 described above in FIG. 5 to start decrementing the deactivation counter. In this third case, the replacement printer P2 is connected to the network via the communication interface 63. In the third case, the printer P1 cannot receive a deactivation instruction from the server 8 after the replacement printer P2 performs an initial printing using special cartridges. However, the printer P1 continues to decrement the deactivation counter. Once the deactivation counter reaches “0”, the printer P1 can deactivate functions such as the print function.

Also conceivable is the fourth case where the printer P1 is disconnected from the network after the controller 61 of the printer P1 executes the process in S122 described above in FIG. 6 to start decrementing the deactivation counter. In this fourth case, the replacement printer P2 is not connected to the network via the communication interface 63. In the fourth case, since the printer P1 does not receive a deactivation instruction from the server 8 via the communication interface 63, the printer P1 continues to decrement the deactivation counter. Once the deactivation counter reaches "0", the printer P1 can deactivate functions such as the print function.

<Example of Steps in Processes Performed in Image Forming Apparatus 1>

Figure 7:
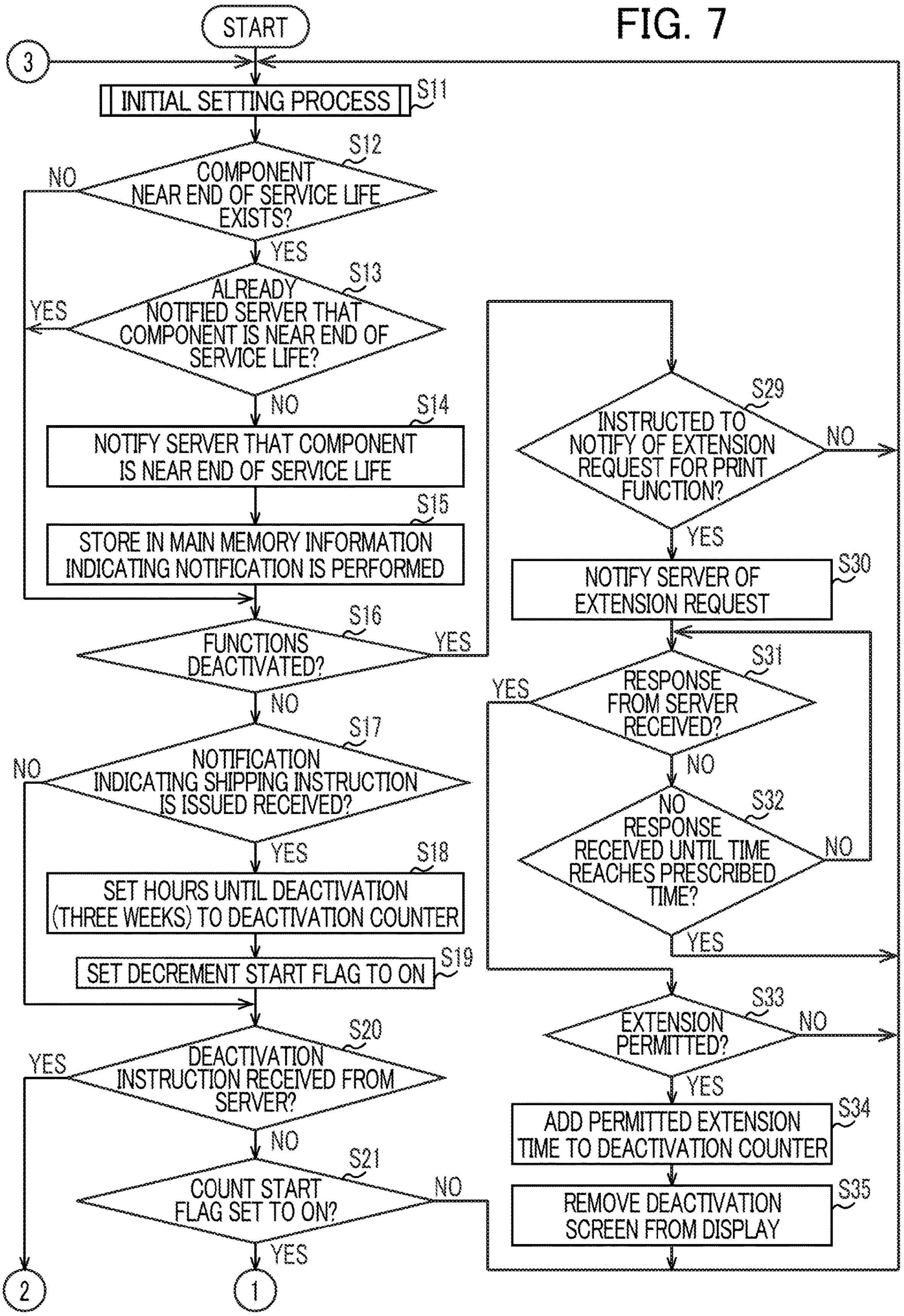
FIG. 7 is a flowchart illustrating a first part of an example of steps in a process performed when the image forming apparatus is replaced.
Figure 8:
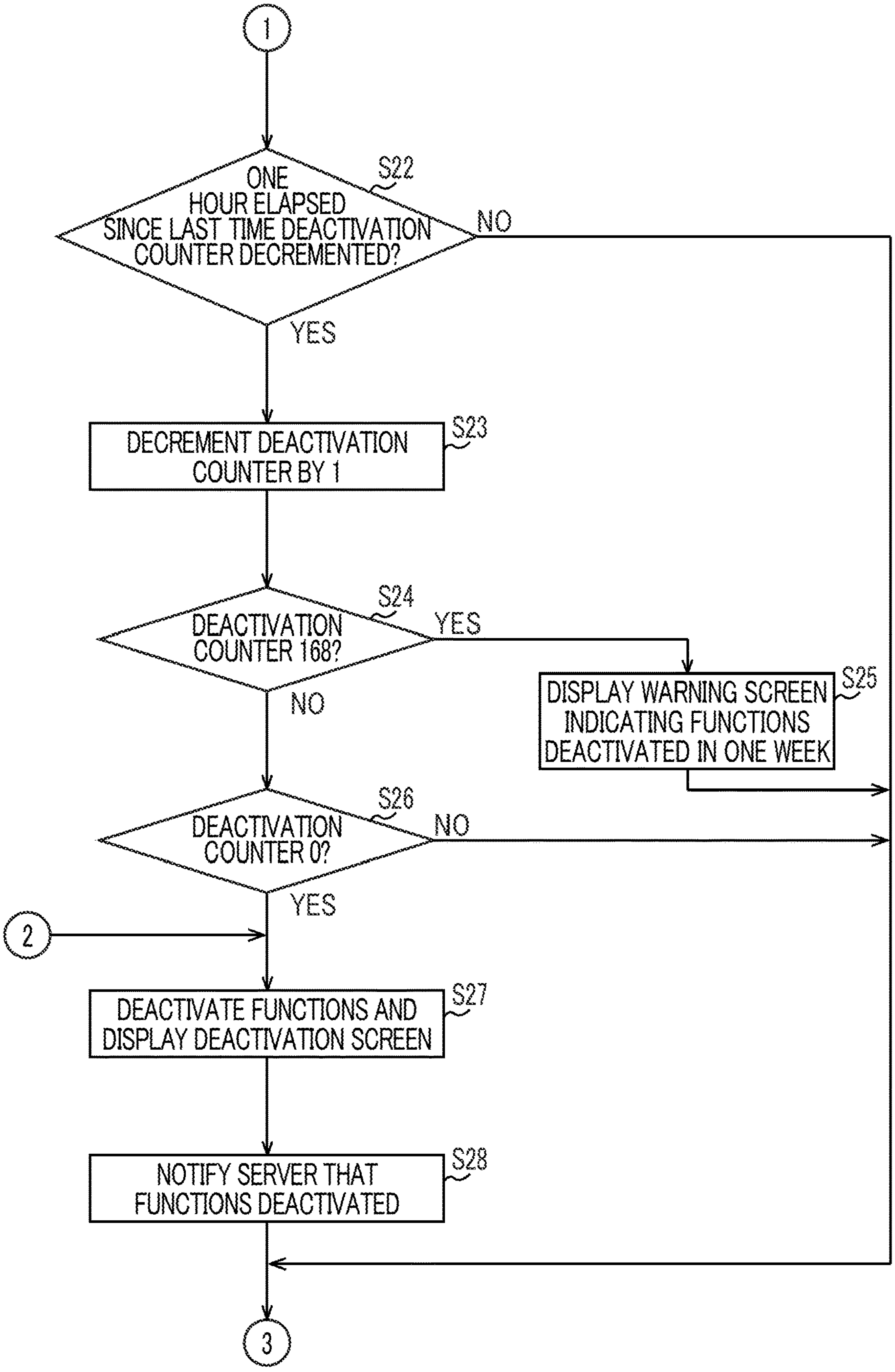
FIG. 8 is a flowchart illustrating a second part of the example of the steps in the process performed when the image forming apparatus is replaced.

FIGS. 7 and 8 are main flowcharts illustrating an example of steps in processes performed in the image forming apparatus 1 in the examples of the operations performed in the image formation system 100 described in FIGS. 5 and 6. The processes illustrated in FIGS. 7 and 8 are executed by the controller 61 of the image forming apparatus 1 each time a prescribed period (for example, at an interval of several milliseconds to several tens of milliseconds) elapses after the user receives and installs the image forming apparatus 1 shipped from the factory and turns on a power switch (not illustrated).

Figure 9:
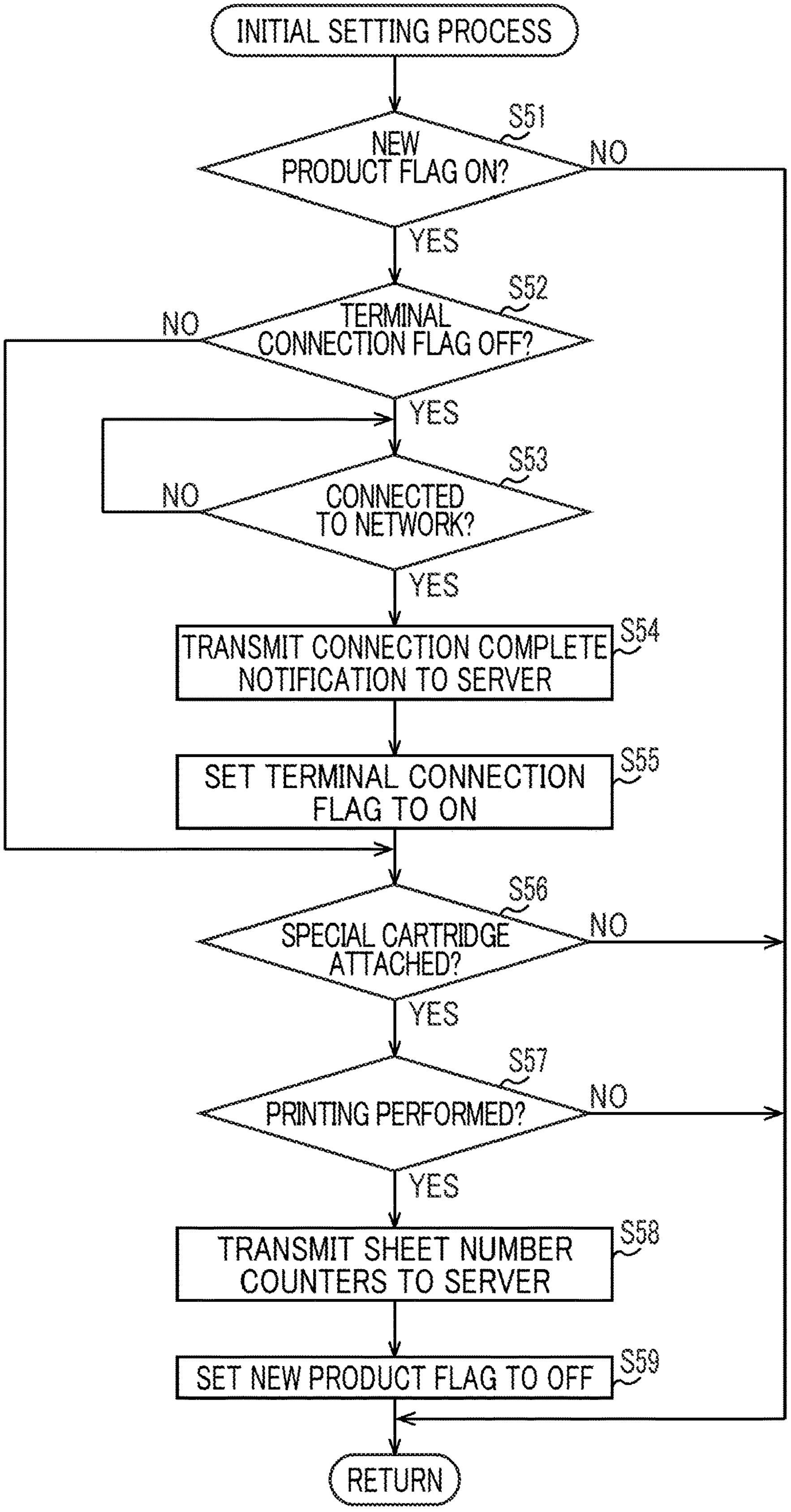
FIG. 9 is a flowchart illustrating an example of steps in an initial setting process which is a subroutine of FIG. 7.

As illustrated in FIG. 7, in S11 the controller 61 of the image forming apparatus 1 first executes an initial setting process as a subroutine of FIG. 7. Here, the initial setting process will be described with reference to FIG. 9. FIG. 9 is a flowchart illustrating an example of the initial setting process as a subroutine of FIG. 7.

<Initial Setting Process>

As illustrated in FIG. 9, in S51 the controller 61 first reads a new product flag from the main memory 62 and determines whether the new product flag is set to ON. When the controller 61 determines in S51 that the new product flag is set to OFF (S51: NO), the controller 61 ends the initial setting process, returns to the main flowchart, and advances to the process in S12. In other words, the controller 61 determines that an initial printing using special cartridge(s) is already performed (S51: NO). Note that the new product flag is set to ON and stored in the main memory 62 when the image forming apparatus 1 is shipped from the factory.

On the other hand, when the controller 61 determines in S51 that the new product flag is set to ON (S51: YES), in S52 the controller 61 reads a terminal connection flag from the main memory 62 and determines whether the terminal connection flag is set to OFF. When the controller 61 determines in S52 that the terminal connection flag is set to ON (S52: NO), the controller 61 advances to the process in S56 (described later). In other words, the controller 61 determines that the image forming apparatus 1 is connected to the user terminal 9 via the network, i.e., the image forming apparatus 1 can communicate with the user terminal 9 via the network (S52: NO) and advances to the process in S56 (described later). The terminal connection flag is set to OFF and stored in the main memory 62 when the image forming apparatus 1 is shipped from the factory.

On the other hand, when the controller 61 determines in S52 that the terminal connection flag is set to OFF (S52: YES), in S53 the controller 61 waits to receive a notification from the user terminal 9 via the communication interface 63 indicating that the user terminal 9 is connected to the image forming apparatus 1 via the network (S53: NO). When the controller 61 receives in S53 a notification from the user terminal 9 via the communication interface 63 indicating that the user terminal 9 is connected to the image forming apparatus 1 via the network (S53: YES), in S54 the controller 61 transmits a connection complete notification to the server 8 via the communication interface 63 indicating that the image forming apparatus 1 is connected to the user terminal 9 via the network. Next, in S55 the controller 61 reads the terminal connection flag from the main memory 62, sets the terminal connection flag to ON, and stores the terminal connection flag in the main memory 62.

Next, the controller 61 advances to the process in S56. In S56 the controller 61 determines whether special cartridges are attached to the image forming apparatus 1. When the controller 61 determines in S56 that special cartridges are not attached to the image forming apparatus 1 (S56: NO), the controller 61 ends the initial setting process, returns to the main flowchart, and advances to the process in S12. The process in S56 is an example of the determining and the causing.

On the other hand, when the controller 61 determines in S56 that special cartridges are attached to the image forming apparatus 1 (S56: YES), in S57 the controller 61 determines whether the image forming apparatus 1 already performed printing using the special cartridges. Specifically, the controller 61 reads the second sheet number counter stored in the storage area 626 of the main memory 62 and determines whether the second sheet number counter is greater than or equal to "1".

When the controller 61 determines in S57 that printing using the special cartridges is not yet performed (S57: NO), the controller 61 ends the initial setting process, returns to the main flowchart, and advances to the process in S12. In other words, when the second sheet number counter is "0", the controller 61 ends the initial setting process, returns to the main flowchart, and advances to the process in S12.

On the other hand, when the controller 61 determines in S57 that printing using the special cartridges is already performed (S57: YES), in S58 the controller 61 transmits the first sheet number counter stored in the storage area 625 of the main memory 62 and the second sheet number counter stored in the storage area 626 of the main memory 62 to the server 8 via the communication interface 63. In S59 the controller 61 reads the new product flag from the main memory 62, sets the new product flag to OFF, and stores the new product flag in the main memory 62. Subsequently, the controller 61 ends the initial setting process, returns to the main flowchart, and advances to the process in S12.

<Deactivation Process>

Referring back to FIG. 7, after the controller 61 executes the initial setting process in S11, the controller 61 reads data from the service life table stored in the storage area 627 of the main memory 62 for each record, and in S12 determines whether there are components in the main casing 10 which are near the end of service life. When the controller 61 determines in S12 that there is no component in the main casing 10 which is near the end of service life (S12: NO), the controller 61 advances to the process in S16 (described later). On the other hand, when determining in S12 that there is any component near the end of service life in the main casing 10 (S12: YES), in S13 the controller 61 determines whether the controller 61 already notifies the server 8 that the component is near the end of service life. The controller 61 makes the determination in S13 based on whether information indicating that the notification to the server 8 is performed is stored in the main memory 62.

When the controller 61 determines in S13 that information indicating that the controller 61 already notifies the server 8 that the component is near the end of service life is stored in the main memory 62 (S13: YES), the controller 61 executes the process in S16 (described later). On the other hand, when the controller 61 determines in S13 that information indicating that the controller 61 already notifies the server 8 that the component is near the end of service life is not stored in the main memory 62 (S13: NO), in S14 the controller 61 notifies the server 8 via the communication interface 63 that the component is near the end of service life. Subsequently, in S15 the controller 61 stores information in the main memory 62 indicating that the controller 61 already notifies the server 8 that the component is near the end of service life.

In S16 the controller 61 determines whether functions such as the print function are already deactivated. When the controller 61 determines in S16 that the print function and other functions are not deactivated (S16: NO), in S17 the controller 61 determines whether a notification is received from the server 8 via the communication interface 63 indicating that the shipping instruction for a replacement printer P2 is sent to the factory. When the controller 61 determines in S17 that a notification is not received from the server 8 via the communication interface 63 indicating that the shipping instruction for a replacement printer P2 is sent to the factory (S17: NO), the controller 61 executes the process in S20 (described later).

On the other hand, when determining in S17 that the controller 61 receives a notification from the server 8 via the communication interface 63 indicating that a shipping instruction for a replacement printer P2 is sent to the factory (S17: YES), in S18 the controller 61 sets, to the deactivation counter stored in the storage area 628 of the main memory 62, the number of hours in a period until the print function and other functions of the image forming apparatus 1 are deactivated, such as "504" representing the hours in three weeks. In S19 the controller 61 reads a decrement start flag for the deactivation counter from the main memory 62, sets the decrement start flag to ON, and stores the decrement start flag in the main memory 62. The decrement start flag is set to OFF and stored in the main memory 62 when the image forming apparatus 1 is shipped from the factory.

Next, in S20 the controller 61 determines whether a deactivation instruction is received from the server 8 via the communication interface 63 instructing the controller 61 to deactivate the print function and other functions. When determining in S20 that the controller 61 receives a deactivation instruction from the server 8 via the communication interface 63 instructing the controller 61 to deactivate the print function and other functions (S20: YES), the controller 61 executes the process in S27 of FIG. 8 (described later). On the other hand, when the controller 61 determines in S20 that a deactivation instruction is not received from the server 8 via the communication interface 63 instructing the controller 61 to deactivate the print function and other functions (S20: NO), in S21 the controller 61 reads a count start flag from the main memory 62 and determines whether the count start flag is set to ON.

When the controller 61 determines in S21 that the count start flag is set to OFF (S21: NO), the controller 61 repeats the process from the initial setting process in S11. On the other hand, when the controller 61 determines in S21 that the count start flag is set to ON (S21: YES), in S22 of FIG. 8 the controller 61 reads a time T1 from the storage area 628 of the main memory 62 and determines whether one hour elapsed since the time T1. The time T1 indicates the last time the deactivation counter was decremented.

When the controller 61 determines in S22 that one hour did not elapse since the last time the deactivation counter was decremented (i.e., counted down; S22: NO), the controller 61 repeats the process from the initial setting process in S11. On the other hand, when the controller 61 determines in S22 that one hour elapsed since the last time the deactivation counter was decremented (S22: YES), in S23 the controller 61 reads the deactivation counter stored in the storage area 628, i.e., a value representing the remaining time until deactivation. The controller 61 then decrements the deactivation counter by "1" and stores the decremented deactivation counter in the storage area 628 of the main memory 62. The controller 61 also stores the time at which the decrement is performed in the storage area 628 as the time T1.

Next, the controller 61 reads the deactivation counter from the storage area 628, i.e., the value representing the remaining time until deactivation, and determines in S24 whether the deactivation counter is "168" representing the number of hours in one week. When the controller 61 determines in S24 that the deactivation counter is "168", representing the number of hours in one week (S24: YES), in S25 the controller 61 displays a warning screen on the display 64 indicating that the print function and other functions will be deactivated in one week. For example, the controller 61 displays the text "The print function will be deactivated in one week" on the display 64. Subsequently, the controller 61 repeats the process from the initial setting process in S11.

On the other hand, when the controller 61 determines in S24 that the deactivation counter is not "168" (S24: NO), in S26 the controller 61 determines whether the deactivation counter, i.e., the remaining time until deactivation, is "0". When the controller 61 determines in S26 that the deactivation counter is not "0" (S26: NO), the controller 61 repeats the process from the initial setting process in S11.

On the other hand, when the controller 61 determines in S26 that the deactivation counter is "0" (S26: YES), in S27 the controller 61 stops decrementing the deactivation counter and deactivates the print function and other functions. The controller 61 also reads the decrement start flag for the deactivation counter from the main memory 62, sets the decrement start flag to OFF, and stores the decrement start flag in the main memory 62. Also, the controller 61 displays a deactivation screen (see FIG. 10) on the display 64 to notify that the print function is now deactivated. In S28 the controller 61 notifies the server 8 via the communication interface 63 that functions including the print function are deactivated. Subsequently, the controller 61 repeats the process from the initial setting process in S11.

On the other hand, when the controller 61 determines in the process of S16 described above that the print function and other functions are deactivated (S16: YES), in S29 the controller 61 determines whether the controller 61 receives an instruction from the user instructing the controller 61 to transmit an extension request for the print function and the like to the server 8. For example, the controller 61 determines whether the controller 61 is instructed to notify the server 8 of a request for extending the print function and the like via the deactivation screen (see FIG. 10) displayed on the display 64 in the process of S27 described above.

Here, an example of the deactivation screen that the controller 61 displays on the display 64 in the process of S27 described above will be described with reference to FIG. 10. The display screen of the display 64 has a touchscreen and the like through which the controller 61 is configured to detect positions at which the user presses the display screen.

Figure 10:
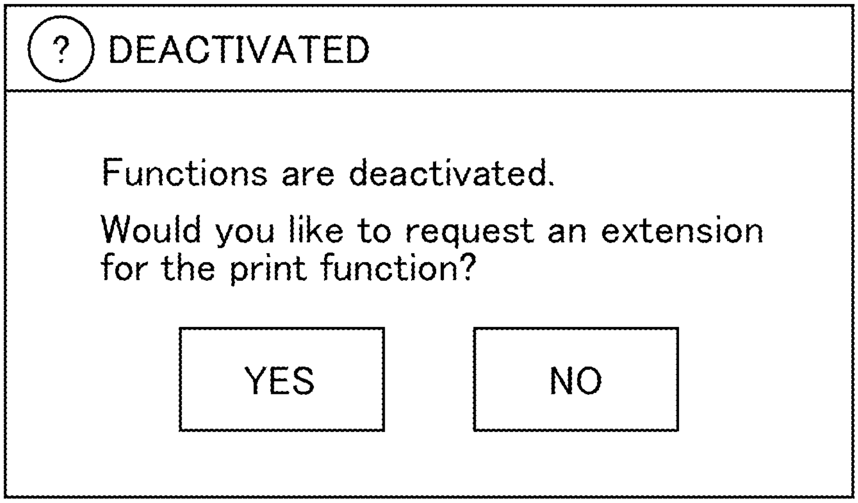
FIG. 10 is a diagram illustrating an example of a deactivation screen displayed on a display while the functions of the image forming apparatus are deactivated.

As illustrated in FIG. 10, the controller 61 displays the text "?: Deactivated" near an upper end portion of the screen in the display 64 to indicate that the print function and other functions are deactivated and to ask whether the user would like to request an extension for the print function. The controller 61 also displays the text "Functions are deactivated." in an approximate center of the screen to indicate that the print function and other functions are deactivated. The controller 61 also displays the text "Would you like to request an extension for the print function?" directly below the text "Functions are deactivated." to ask the user whether to request an extension for the print function and the like from the server 8. At a lower end portion of the screen, the controller 61 displays a Yes button to indicate a desire to apply for an extension, and a No button to indicate a desire not to apply for an extension.

When the position of the Yes button is not pressed with a finger or the like, the controller 61 determines in S29 that the controller 61 is not instructed by the user to transmit to the server 8 an extension request for the print function and the like (S29: NO), and repeats the process from the initial setting process in S11. On the other hand, when the position of the Yes button is pressed with a finger or the like, the controller 61 determines in S29 that the controller 61 is instructed by the user to transmit to the server 8 an extension request for the print function and the like (S29: YES). In this case, in S30 the controller 61 notifies the server 8 of an extension request requesting the server 8 to extend the print function and the like.

In S31 the controller 61 determines whether a notification is received from the server 8 via the communication interface 63. When the controller 61 determines in S31 that a notification is not received from the server 8 via the communication interface 63, i.e., that there is no response from the server 8 (S31: NO), in S32 the controller 61 waits for a response from the server 8 until a wait time reaches a prescribed time (S32: NO). When the controller 61 determines in S32 that no response is received from the server 8 before the wait time reaches the prescribed time (S32: YES), the controller 61 repeats the process from the initial setting process in S11.

On the other hand, when the controller 61 determines in S31 that a notification is received from the server 8, i.e., a response is received from the server 8 (S31: YES), in S33 the controller 61 determines whether the notification from the server 8 permits an extension of the print function and other functions. When the controller 61 determines in S33 that the notification does not permit an extension of the print function and other functions (S33: NO), the controller 61 repeats the process from the initial setting process in S11.

On the other hand, when the controller 61 determines in S33 that the notification permits an extension of the print function and other functions (S33: YES), in S34 the controller 61 adds a value representing the permitted extension time to the deactivation counter stored in the storage area 628 of the main memory 62. For example, when the controller 61 receives a notification with an addition request from the server 8 via the communication interface 63 instructing the controller 61 to add "504", which represents an extension time of three weeks, the controller 61 adds "504" to the deactivation counter stored in the main memory 62 in order to activate the print function and other functions of the image forming apparatus 1.

In S35 the controller 61 then removes from the display screen of the display 64 the deactivation screen (see FIG. 10) displayed in the process of S27 and indicating that the print function is deactivated. Thereafter, the controller 61 repeats the process from the initial setting process in S11. This process extends the use of the print function and other functions on the image forming apparatus 1 by an extension time permitted by the server 8, thereby enabling the user to print on the image forming apparatus 1 using special cartridges.

MODIFICATIONS OF EMBODIMENT

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Modification 1: Modification of Process in S58

In the process of S58 described above (see FIG. 9), instead of the first sheet number counter and the second sheet number counter, the controller 61 may transmit print information to the server 8 via the communication interface 63 indicating that printing using special cartridges is already performed. In this case, in the process of S113 described above (see FIG. 5), the server controller 81 receives print information from the replacement printer P2 via the server communication interface 83 indicating that printing is already performed using special cartridges. Then, the server controller 81 may execute the process in S136 and S137 (see FIG. 5) to transmit a deactivation instruction to the printer P1 via the server communication interface 83 instructing the printer P1 to deactivate the print function and other functions.

Through the above process, changing of settings by the user on the printer P1 and the replacement printer P2 when replacing the printer P1 as a contracted machine with the replacement printer P2 can be facilitated. In addition, the user can print on the printer P1 using special cartridges until the replacement printer P2 starts printing using special cartridges as the contracted machine.

Modification 2

The drum cartridge 20 may include the developing roller 41 in addition to the photosensitive drum 21, the cartridge casing, the drum memory 22, and a charger. In this case, the photosensitive drum 21, the drum memory 22, the charger, and the developing roller 41 are provided in the cartridge casing of the drum cartridge 20; and the toner cartridge 4 includes the cartridge casing and the toner memory 42 but does not include the developing roller 41. The cartridge casing of the toner cartridge 4 accommodates therein toner. The outer circumferential surface of the developing roller 41 contacts the outer circumferential surface of the photosensitive drum 21 inside the drum cartridge 20.

Modification 3

The toner cartridge 4 may be configured of two cartridges (not illustrated). In this case, one of the two cartridges constituting the toner cartridge 4 includes the developing roller 41, while the other of the two cartridges includes the cartridge casing and the toner memory 42. The cartridge casing accommodates therein toner.

Modification 4

The image forming apparatus 1 may include a single cartridge (not illustrated) in place of the drum cartridge 20 and the toner cartridge 4. This single cartridge includes the photosensitive drum 21, a cartridge casing, a memory, the charger, and the developing roller 41. The outer circumferential surface of the developing roller 41 contacts the outer circumferential surface of the photosensitive drum 21 inside the single cartridge. The cartridge casing of the single cartridge accommodates therein toner.

Modification 5

In the image forming apparatus 1, the drum cartridges 20 and the corresponding toner cartridges 4 may be attachable to and detachable from the main casing 10 independently of each other.

Modification 6

The image forming apparatus 1 may be a multifunction printer (MFP) also having other functions such as a scanning or a facsimile function. An image forming apparatus 1 configured as an MFP can execute processes the same as various processes described in the above embodiment. The image forming apparatus 1 according to this modification exhibits the same advantages as the image forming apparatus 1 in the embodiment described above.

Modification 7

The printing medium used in the image forming apparatus 1 is not limited to paper but may be tape, for example. In a case where the printing medium is tape, a tape cassette for supplying tape is attached to the image forming apparatus 1, and the image forming apparatus 1 performs printing on the tape conveyed from the tape cassette. In this case, the image forming apparatus 1 may be a laser printer or an inkjet printer.

Modification 8

The image forming apparatus 1 may be an inkjet printer. In a case where the image forming apparatus 1 is an inkjet printer, ink cartridges are attachable to the cartridge retaining portions 13 of the image forming apparatus 1 instead of the drum cartridges 20 and the toner cartridges 4 described in the embodiment. There is no particular restriction on the number of ink cartridges attachable to the image forming apparatus 1. For example, a total of four ink cartridges corresponding to the four colors of cyan, magenta, yellow, and black may be attached to the image forming apparatus 1, or a single ink cartridge for the color of black may be attached to the image forming apparatus 1.

Each of the ink cartridges includes an ink memory mounted therein. The ink memory stores therein an ink ID, ink type information, and a remaining quantity of ink, for example. Note that the remaining quantity of ink need not be stored in the ink memory. The ink ID is information similar to the toner ID. The ink type information is information similar to the toner type information.

Similar to the above embodiment, the processes of FIGS. 1 to 10 are also executed in a case where the image forming apparatus 1 is an inkjet printer. Specifically, in a case where the image forming apparatus 1 is the inkjet printer, the terms "toner cartridge 4," "toner memory 42," "toner ID," and "toner type information" in the description of the embodiment described above may be replaced with the terms "ink cartridge", "ink memory", "ink ID", and "ink type information", respectively. The advantages for the image forming apparatus 1 according to the above embodiment can also be exhibited in a case where the image forming apparatus 1 is the inkjet printer.

<Implementation Through Software>

The functions of the image forming apparatus 1 can be implemented by a program that causes a computer to function as the image forming apparatus 1 and that causes the computer to function as the controller 61 of the image forming apparatus 1.

In this case, the image forming apparatus 1 includes a computer possessing at least one controller (e.g., a processor) and at least one storage device (e.g., a memory) as a hardware required for executing the program. Each function described in the above embodiment is implemented by executing the program using these controller and storage device.

The program described above may be stored in one or more non-transitory computer-readable storage media. These storage media may be provided in the image forming apparatus 1 but need not be. In the latter case, the program described above may be transmitted to the image forming apparatus 1 through any wired or wireless transmission medium.

All or some of the functions of the controller 61 may also be implemented by logic circuits. For example, an integrated circuit having logic circuits that function as the above control blocks falls within the scope of the present disclosure.

What is claimed is:

1. An image forming apparatus comprising:
a communication interface; and
a controller configured to perform:
receiving, from an external device via the communication interface, a notification indicating that the image forming apparatus is to be replaced;
when receiving the notification, starting measuring a period of time; and
when the measured period of time reaches a prescribed period of time, deactivating a prescribed function of the image forming apparatus.

2. The image forming apparatus according to claim 1, wherein the controller is configured to further perform:
when performing the deactivating, transmitting deactivation information to the external device via the communication interface to cause a concluded agreement for the image forming apparatus to be cancelled, the deactivation information indicating that the prescribed function of the image forming apparatus is deactivated.

3. The image forming apparatus according to claim 1, wherein the controller is configured to further perform:
when receiving a request requesting to permit the prescribed function to be used again for a prescribed time period in a state where the prescribed function is deactivated, deactivating the prescribed function of the image forming apparatus after the prescribed time period elapses.

* * * * *